(12) United States Patent
Nam et al.

(10) Patent No.: US 9,481,237 B2
(45) Date of Patent: Nov. 1, 2016

(54) SYSTEM AND METHOD FOR CONTROLLING AIR FLOW IN VEHICLE

(71) Applicant: Hyundai Motor Company, Seoul (KR)

(72) Inventors: Jongwoo Nam, Seoul (KR); Hyun Cho, Seoul (KR); Joonho Lee, Seoul (KR); Hanshin Chung, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/556,811

(22) Filed: Dec. 1, 2014

(65) Prior Publication Data

US 2015/0343893 A1    Dec. 3, 2015

(30) Foreign Application Priority Data

May 27, 2014   (KR) .......................... 10-2014-0063874

(51) Int. Cl.
*B60R 22/00* (2006.01)
*B60K 11/08* (2006.01)
*B60K 11/06* (2006.01)
*B60K 13/02* (2006.01)
*F01P 7/10* (2006.01)
*F02M 35/10* (2006.01)
*F02M 35/16* (2006.01)
(Continued)

(52) U.S. Cl.
CPC .............. *B60K 11/085* (2013.01); *B60K 11/06* (2013.01); *B60K 13/02* (2013.01); *F01P 7/10* (2013.01); *F02M 35/10013* (2013.01); *F02M 35/161* (2013.01); *F01P 2025/13* (2013.01); *F01P 2025/30* (2013.01); *F01P 2025/42* (2013.01); *F01P 2025/64* (2013.01); *F01P 2025/66* (2013.01); *F02B 29/0406* (2013.01); *F02M 35/04* (2013.01)

(58) Field of Classification Search
CPC ............................ B60K 11/085; B60K 11/06
USPC ............ 701/49, 36; 123/41.01, 41.21, 41.49
See application file for complete search history.

(56) References Cited

U.S. PATENT DOCUMENTS 1,161,444 A    11/1915  Boughton
1,170,730 A     2/1916  Benjamin et al.
(Continued)

FOREIGN PATENT DOCUMENTS

GB    2 143 025 A    1/1985
JP    57-212321 A   12/1982
(Continued)

*Primary Examiner* — Thomas G Black
*Assistant Examiner* — Luke Huynh
(74) *Attorney, Agent, or Firm* — Morgan, Lewis & Bockius LLP

(57) ABSTRACT

A system for controlling an air flow in a vehicle may include a front air introduction apparatus mounted in front of an engine, a condenser provided to the front air introduction apparatus, an intercooler provided behind the condenser, a radiator provided between the intercooler and the engine, an active air flap for controlling air flow being introduced to the front air introduction apparatus, a side air introduction apparatus mounted to a side of an engine compartment for forwarding air to the engine, a connection line connected between the side air introduction apparatus and the front air introduction apparatus, a control valve for controlling air flow through the connection line, a plurality of sensors for measuring an operation state of the vehicle, and a control unit for determining an operation state of the vehicle based on a plurality of sensor signals, and controlling operation of the control valve.

5 Claims, 6 Drawing Sheets

(51) Int. Cl.
   *F02B 29/04*      (2006.01)
   *F02M 35/04*      (2006.01)

(56) References Cited

U.S. PATENT DOCUMENTS

| | | | |
|---|---|---|---|
| 1,771,714 | A | 7/1930 | Lawrence |
| 1,949,009 | A | 2/1934 | Georges |
| 2,034,587 | A | 3/1936 | Maxwell |
| 2,246,823 | A | 6/1941 | Vollberg |
| 3,210,758 | A | 10/1965 | Huston |
| 3,854,459 | A | 12/1974 | Stimeling |
| D281,273 | S | 11/1985 | Artwick |
| 4,590,889 | A | 5/1986 | Hiereth |
| 4,756,279 | A | 7/1988 | Temmesfeld |
| 4,779,518 | A | 10/1988 | Artwick |
| 4,865,816 | A | 9/1989 | Walz |
| 5,060,901 | A | 10/1991 | Lathrop |
| 5,344,287 | A | 9/1994 | Schaefer |
| 5,758,716 | A | 6/1998 | Shibata |
| 6,024,536 | A | 2/2000 | Tsubakida |
| 6,192,838 | B1 * | 2/2001 | Matsuo ............... B60K 11/08 123/41.01 |
| 6,309,178 | B1 | 10/2001 | Kim |
| 6,994,058 | B2 | 2/2006 | Iinuma et al. |
| 7,025,086 | B2 | 4/2006 | Maeda |
| D524,435 | S | 7/2006 | Linn |
| 7,882,888 | B1 | 2/2011 | Bugby |
| 8,197,204 | B2 | 6/2012 | Aschermann |
| 8,627,911 | B2 | 1/2014 | Tregnago |
| 8,922,033 | B2 | 12/2014 | Vallinayagam |
| 8,936,121 | B2 | 1/2015 | Vacca |
| 2004/0216863 | A1 | 11/2004 | Hu |
| 2004/0226764 | A1 | 11/2004 | Iwasaki |
| 2004/0261983 | A1 | 12/2004 | Hu |
| 2005/0061487 | A1 | 3/2005 | Kroliczek |
| 2007/0119395 | A1 | 5/2007 | Nagano |
| 2007/0169725 | A1 | 7/2007 | Harich |
| 2010/0006043 | A1 | 1/2010 | Kardos |
| 2010/0186934 | A1 | 7/2010 | Bellenfant |
| 2011/0088671 | A1 | 4/2011 | Johnson |
| 2011/0114286 | A1 | 5/2011 | Komatsu |
| 2011/0203861 | A1 | 8/2011 | Charnesky |
| 2011/0219762 | A1 | 9/2011 | Kobayashi |
| 2011/0232865 | A1 | 9/2011 | Mildner |
| 2012/0090823 | A1 | 4/2012 | Labaste Mauhe |
| 2012/0227926 | A1 | 9/2012 | Field |
| 2012/0263980 | A1 | 10/2012 | Soukhojak |
| 2012/0291991 | A1 | 11/2012 | Denkenberger |
| 2012/0318473 | A1 | 12/2012 | Nishikawa |
| 2013/0284415 | A1 | 10/2013 | Katoh |
| 2013/0316634 | A1 * | 11/2013 | Ajisaka ............... B60H 1/3407 454/152 |
| 2014/0090808 | A1 | 4/2014 | Bessho |
| 2014/0366816 | A1 | 12/2014 | Platt |
| 2015/0101789 | A1 * | 4/2015 | Enomoto ........... B60H 1/00485 165/202 |
| 2015/0315955 | A1 | 11/2015 | Nam |
| 2015/0330288 | A1 | 11/2015 | Nam |

FOREIGN PATENT DOCUMENTS

| | | |
|---|---|---|
| JP | 2004-284514 A | 10/2004 |
| JP | 2005-170375 A | 6/2005 |
| JP | 2010-001767 A | 1/2010 |
| JP | 2010-25009 A | 2/2010 |
| JP | 4450066 B2 | 2/2010 |
| JP | 2011-126434 A | 6/2011 |
| JP | 2012-240478 A | 12/2012 |
| JP | 2012-246790 A | 12/2012 |
| KR | 20-1998-0033347 U | 9/1998 |
| KR | 10-2002-0092050 A | 12/2002 |
| KR | 10-2011-0080037 A | 7/2011 |
| KR | 10-2011-0096760 A | 8/2011 |
| KR | 10-2011-0109034 A | 10/2011 |
| KR | 10-2012-0050871 A | 5/2012 |
| KR | 10-2012-0058952 A | 6/2012 |
| KR | 10-2013-0063663 A | 6/2013 |
| KR | 10-2013-0143704 A | 12/2013 |

* cited by examiner

SYSTEM AND METHOD FOR CONTROLLING AIR FLOW IN VEHICLE

CROSS-REFERENCE TO RELATED APPLICATION

The present application claims priority to Korean Patent Application No. 10-2014-0063874 filed May 27, 2014, the entire contents of which is incorporated herein for all purposes by this reference.

BACKGROUND OF THE INVENTION

1. Field of the Invention

The present invention relates to a system and method for controlling air flow in a vehicle. More particularly, the present invention relates to a system and method for controlling air flow in a vehicle, which can improve cooling efficiency and aerodynamic characteristics.

2. Description of Related Art

A vehicle body is a part which forms an exterior appearance of a vehicle inclusive of an engine, in which, in general, an engine compartment contains the engine, a transmission, a cooling unit, and various pieces of auxiliary machinery mounted therein.

In front of the engine, there is a radiator, an intercooler, and a condenser arranged in succession, for cooling the engine, intake or mixture gas of the intake and exhaust gas, and refrigerant for an air conditioner, with outdoor air.

In the meantime, the air passed through the condenser rises around 20° C. and the air passed through the intercooler rises around 10° C. Therefore, the air is introduced to the radiator in a state that it is around 30° C. hotter than the outdoor temperature.

Consequently, a problem takes place in which the cooling efficiency of the intercooler and the radiator which are arranged behind the condenser in succession become poor.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and method for controlling air flow in a vehicle having advantages of improving cooling efficiency and aerodynamic characteristics.

Various aspects of the present invention are directed to providing a system and method for controlling air flow in a vehicle, which can improve cooling efficiency and aerodynamic characteristics.

According to various aspects of the present invention, a system for controlling an air flow in a vehicle may include a front air introduction apparatus mounted in front of an engine, a condenser provided to the front air introduction apparatus, an intercooler provided behind the condenser, a radiator provided between the intercooler and the engine, an active air flap provided in front of the condenser for controlling air flow being introduced to the front air introduction apparatus, a side air introduction apparatus mounted to a side of an engine compartment for forwarding air to the engine, a connection line connected between the side air introduction apparatus and the front air introduction apparatus, a control valve for controlling air flow through the connection line, a plurality of sensors for measuring an operation state of the vehicle, and a control unit for determining an operation state of the vehicle based on a plurality of sensor signals, and controlling operation of the control valve.

The control unit may control operation of the control valve according to the operation state of the vehicle, to block the connection line, fully to open the connection line, to make the air flow between the condenser and the intercooler, or to make the air flow between the intercooler and the radiator.

The plurality of sensors may include a vehicle speed sensor for measuring a speed of a vehicle and forwarding a signal thereof to the control unit, an air temperature sensor for measuring a temperature of external air and forwarding a signal thereof to the control unit, a refrigerant temperature sensor for measuring a temperature of refrigerant flowing through the condenser and forwarding a signal thereof to the control unit, an intercooler temperature sensor for measuring a temperature of air flowing through the intercooler and forwarding a signal thereof to the control unit, a cooling water temperature sensor for measuring a temperature of cooling water flowing through the radiator and forwarding a signal thereof to the control unit, and an engine RPM sensor for measuring an engine RPM and forwarding a signal thereof to the control unit.

The system may further include a cooling fan provided between the radiator and the engine, in which the control unit may control the cooling fan and the active air flap based on the plurality of sensor signals.

According to various aspects of the present invention, a method for controlling a system for controlling air flow in a vehicle may include: when an operation state of the vehicle falls under a high speed and high load condition, a control unit may control to open an active air flap, operate a cooling fan, and may control a control valve to make air flowing through the control valve flow between a condenser and an intercooler, when the operation state of the vehicle falls under a low speed and high load condition, the control unit may control to open the active air flap, operate the cooling fan, and may control the control valve to make the air flowing through the control valve flow between the intercooler and a radiator, when the operation state of the vehicle falls under an aerodynamic running condition, the control unit may control to close the active air flap, turns off the operation of the cooling fan, and may control the control valve to block the air flowing through the control valve, and when the operation state of the vehicle falls under a natural cooling condition, the control unit may control to open the active air flap and to operate the cooling fan, and may control the control valve to be opened, in which the system may include a front air introduction apparatus mounted in front of an engine, the condenser provided to the front air introduction apparatus, the intercooler provided behind the condenser, the radiator provided between the intercooler and the engine, the active air flap provided in front of the condenser for controlling air flow being introduced to the front air introduction apparatus, the cooling fan provided between the radiator and the engine, a side air introduction apparatus mounted to a side of the engine compartment for forwarding air to the engine, a connection line connected between the side air introduction apparatus and the front air introduction apparatus, the control valve for controlling air flow through the connection line, a vehicle speed sensor for measuring a speed of the vehicle and forwarding a signal thereof to the control unit, an air temperature sensor for measuring a temperature of external air and forwarding a signal thereof to the control unit, a refrigerant temperature sensor for measuring a temperature of refrigerant flowing through the condenser and forwarding a signal thereof to the control unit, an intercooler temperature sensor for measuring a temperature of air flowing through the intercooler and forwarding a signal thereof to the control unit, a cooling water temperature sensor for measuring a temperature of cooling water flowing through the radiator and forwarding a signal thereof to the control unit, an engine RPM sensor for measuring an engine RPM and forwarding a signal thereof to the control unit, and a control unit for determining the operation state of the vehicle based on the signals from the sensors and controlling operation of the cooling fan, the active air flap, and the control valve The system and method for controlling air flow in a vehicle in accordance with various embodiments of the present invention can increase cooling efficiency because the external air can be directly forwarded to the intercooler and the radiator.

Further, the system and method for controlling air flow in a vehicle in accordance with various embodiments of the present invention can improve aerodynamic characteristics of the vehicle because the introduction of the external air can be selectively blocked.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
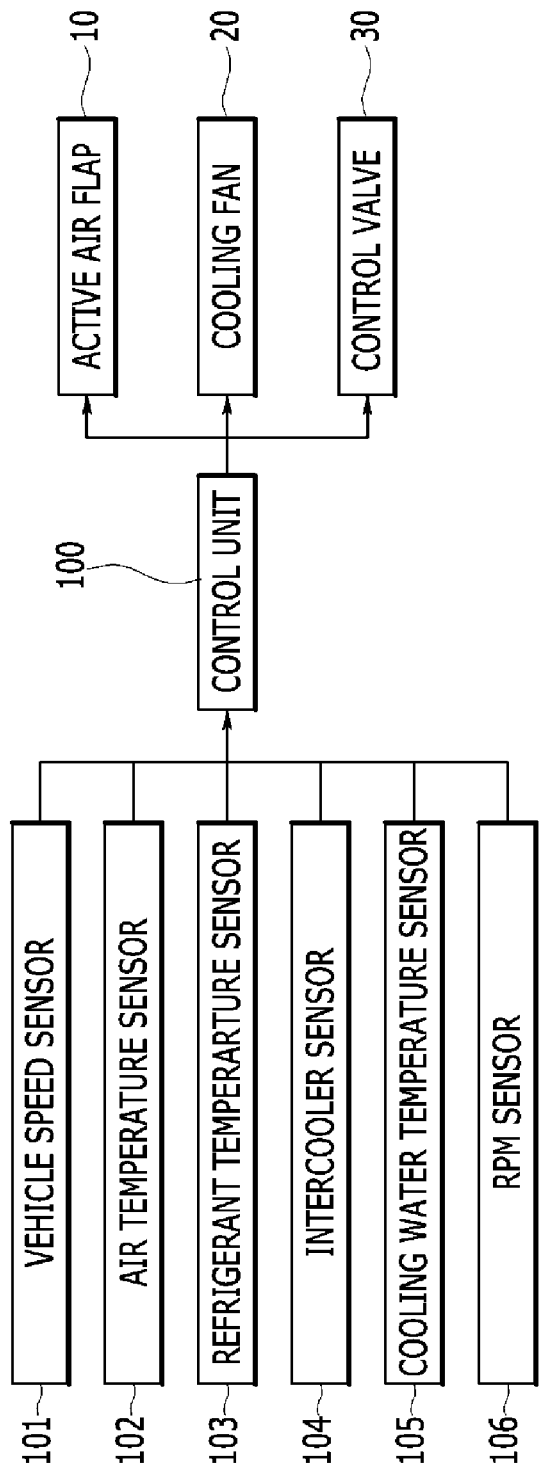
FIG. 1 illustrates a block diagram of an exemplary system for controlling air flow in a vehicle according to the present invention.

FIG. 1 illustrates a block diagram of a system for controlling air flow in a vehicle in accordance with an exemplary embodiment of the present invention.

Referring to FIG. 1, the system for controlling an air flow in a vehicle includes a vehicle speed sensor 101 for measuring a speed of a vehicle and forwarding a signal thereof to a control unit 100, an air temperature sensor 102 for measuring a temperature of external air and forwarding a signal thereof to the control unit 100, a refrigerant temperature sensor 103 for measuring a temperature of refrigerant flowing through a condenser and forwarding a signal thereof to the control unit 100, an intercooler temperature sensor 104 for measuring a temperature of air flowing through an intercooler and forwarding a signal thereof to the control unit 100, a cooling water temperature sensor 105 for measuring a temperature of cooling water flowing through a radiator and forwarding a signal thereof to the control unit 100, and an engine RPM sensor 106 for measuring an engine RPM and forwarding a signal thereof to the control unit 100.

The control unit 100 receives the signals from the sensors 101-106 to determine an operation state of the vehicle, and controls operation of an active air flap 10, a cooling fan 20 and a control valve 30.

FIG. 2, FIG. 3, FIG. 4 and FIG. 5 illustrate schematic views showing operation states of a system for controlling air flow in a vehicle in accordance with various embodiments of the present invention.

Referring to FIG. 1, FIG. 2, FIG. 3, FIG. 4 and FIG. 5, the system for controlling air flow in a vehicle includes a front air introduction unit 50 mounted in front of an engine 40, a condenser 80 provided to the front air introduction unit 50, an intercooler 82 provided behind the condenser 80, a radiator 84 provided between the intercooler 82 and the engine 40, the active air flap 10 provided in front of the condenser 80 for controlling air flow being introduced to the front air introduction unit 50, a side air introduction unit 60 mounted to a side of the engine compartment for forwarding air to the engine 40, a connection line 70 connected between the side air introduction unit 60 and the front air introduction unit 50, and the control valve 30 for controlling air flow through the connection line 70.

The side air introduction unit 60 receives the external air from in front of the active air flap 10, and supplies the external air to the engine 40 through an air cleaner 42 and an intake hose 44. The control valve 30 is provided in the connection line 70 for making the external air to be selectively forwarded to the intercooler 82 and the radiator 84 directly without being passed through the condenser 80.

The control unit 100 may receive the signals from the sensors 101-106, determine an operation state of the vehicle, and control operation of the control valve 30 according to the operation state of the vehicle to block the connection line 70, fully open the connection line 70, make the air flow between the condenser 80 and the intercooler 82, or make the air flow between the intercooler 82 and the radiator 84.

Further, the control unit 100 may receive the signals from the sensors 101-106 to determine the operation state of the vehicle and control operation of the cooling fan 20 and the active flap 10 with reference to the signals from the plurality of sensor 101-106.

In this case, the cooling fan 20 may be rotated by a motor of which rotation speed is controllable, for turning off the cooling fan 20, or controlling RPM of the cooling fan 20 under the control of the control unit 100.

The active air flap 10 controls the air flow being introduced from outside of the vehicle according to a signal from the control unit 100 such that, when the active air flap 10 is opened, the external air is introduced through the front air introduction unit 50 for cooling the radiator 84 and so on, and when the active flap 10 is closed, the external air is blocked for making warming up of the engine 40 easy, or when cooling is not required, for improving aerodynamic characteristics of the vehicle.

Hereinafter, a system and method for controlling air flow in a vehicle in accordance with various embodiments of the present invention will be described with reference to the drawings.

Figure 2:
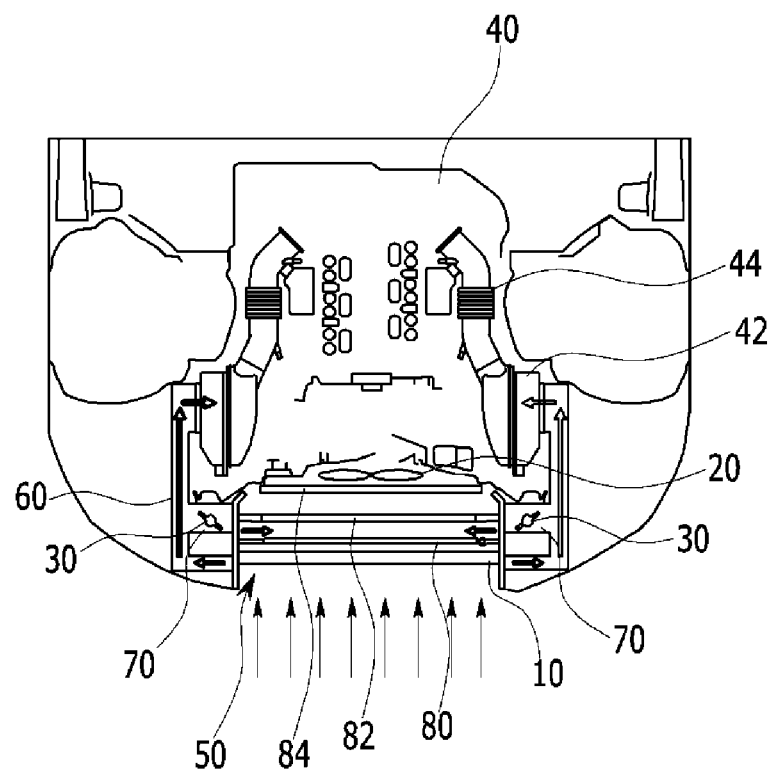
FIG. 2, FIG. 3, FIG. 4, and FIG. 5 illustrate schematic views showing operation states of the exemplary system for controlling air flow in the vehicle according to the present invention.

Referring to FIG. 1 and FIG. 2, if the control unit 100 receives signals from the sensors 101-106 and determines that the operation state of the vehicle falls under a high speed and a high load condition, the control unit 100 controls to open the active air flap 10, operates the cooling fan 20, and controls the control valve 30 to make the air flowing through the control valve 30 to flow between the condenser 80 and the intercooler 82.

The high speed and high load condition is, as an example, a state in which the vehicle speed is about 90-110 kph and the engine RPM is 2000-4000, which may be defined as a state in which more cooling of the air or a mixed gas of air and exhaust gas flowing through the intercooler 82 is required. The high speed and high load condition may also be defined to include a temperature condition of the air or the mixed gas flowing through the intercooler 82.

In the high speed and high load condition, since the external air is introduced to the front of the intercooler 82 through the connection line 70, cooling efficiency of the intercooler 82 can be increased.

Figure 3:
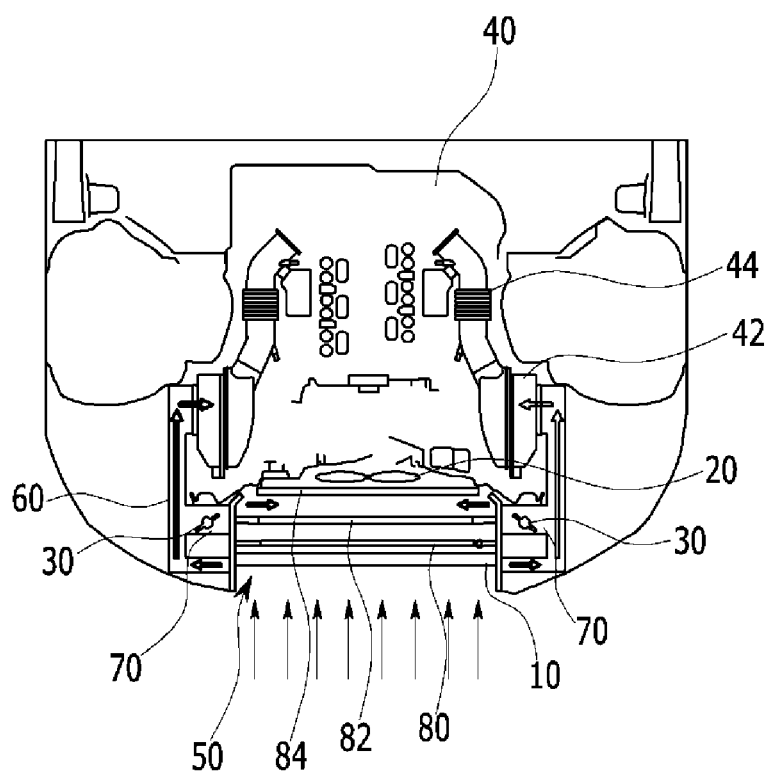

Referring to FIG. 1, FIG. 2 and FIG. 3, if the control unit 100 receives the signals from the sensors 101-106 and determines that the operation state of the vehicle falls under a low speed and high load condition, the control unit 100 controls to open the active air flap 10, operates the cooling fan 20, and controls the control valve 30 to make the air flowing through the control valve 30 flow between the intercooler 82 and the radiator 84.

The predetermined low speed and high load condition may be, as an example, a state in which the vehicle speed is about 30-40 kph and the engine RPM is 2000-4000, and may be defined as a state in which more cooling of the cooling water flowing through the radiator 84 is required.

In the low speed and high load condition, since the external air is introduced to the front of the radiator 84 through the connection line 70, the cooling efficiency of the radiator 84 can be increased.

Figure 4:
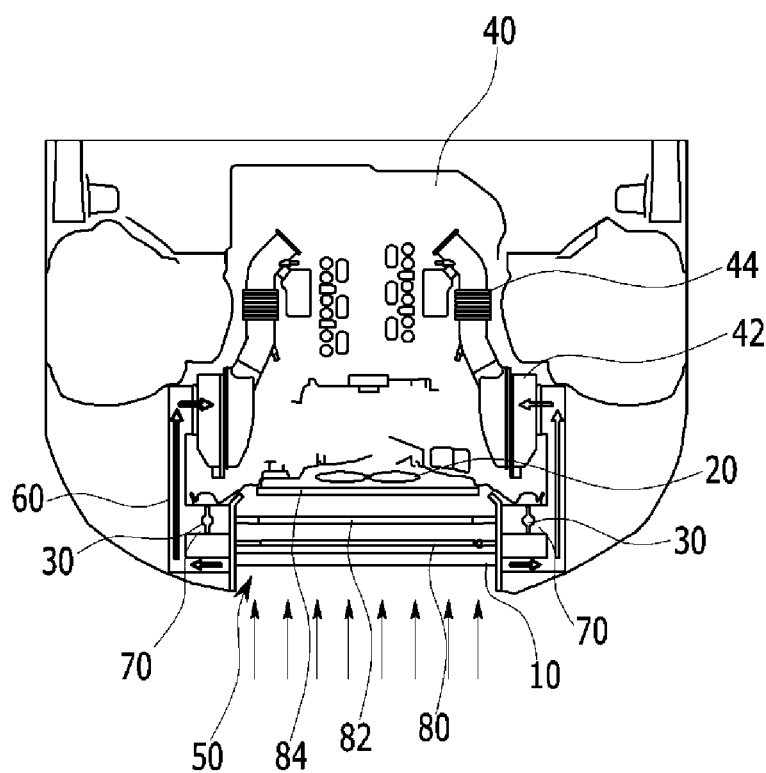

Referring to FIG. 1 and FIG. 4, if the control unit 100 receives the signals from the sensors 101-106 and determines that the operation state of the vehicle falls under an aerodynamic running condition, the control unit 100 controls to close the active air flap 10, turns off the operation of the cooling fan 20, and controls the control valve 30 to block the air flowing through the control valve 30.

The aerodynamic running condition may be defined as a state in which the cooling with the external air is not required, which may be defined as a state in which, as an example, the present cooling requirement is relatively low, reduction of drag is required to improve running performance by blocking flow of the external air to the engine compartment by closing the active air flap 10 and the control valve 30, or warming up of the engine is required. Moreover, a case may also be included in which the external air temperature is below a predetermined temperature.

Figure 5:
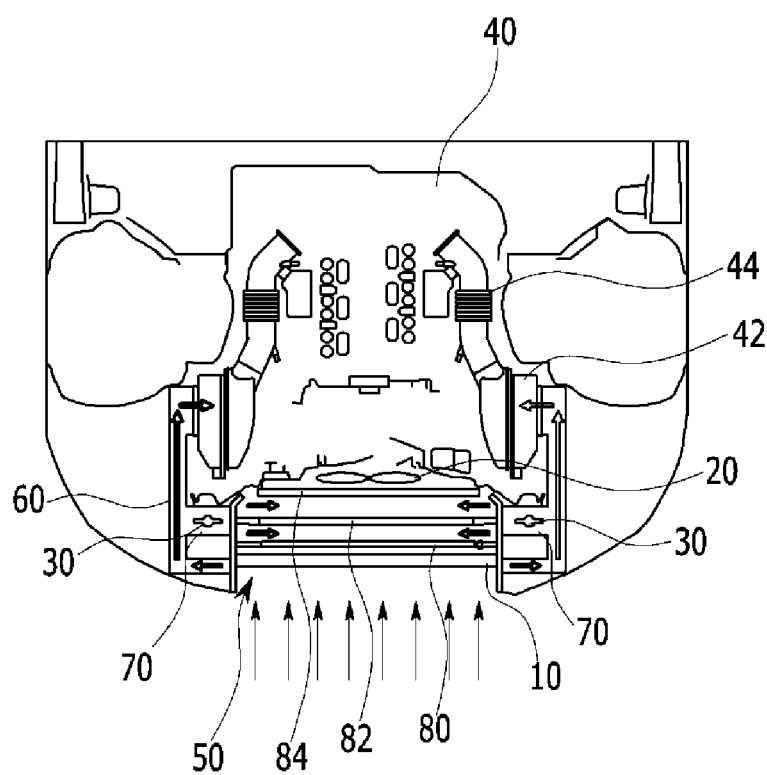

Referring to FIG. 1 and FIG. 5, if the control unit 100 receives the signals from the sensors 101-106 and determines that the operation state of the vehicle falls under a natural cooling condition, the control unit 100 controls to open the active air flap 10 and to operate the cooling fan 20, and controls the control valve 30 to be opened.

The natural cooling condition may be defined as a state in which the external air has a higher temperature than a predetermined temperature to require cooling with the external air, or simultaneous cooling of the intercooler 82 and the radiator 84 is required.

In the natural cooling condition, the operation and the RPM of the cooling fan 20 may be determined according to an external air temperature.

Figure 6:
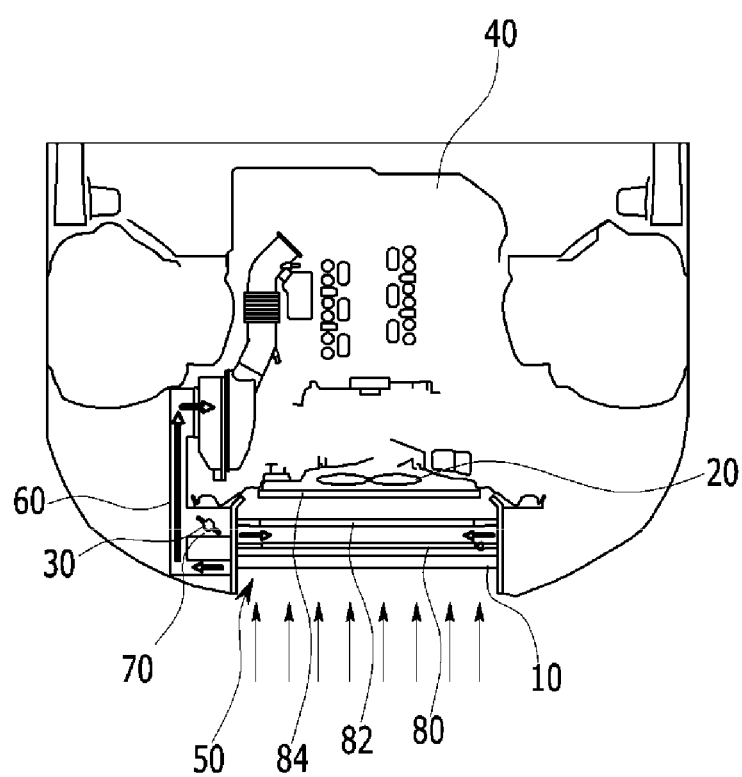
FIG. 6 illustrates a schematic view of a variation of the exemplary system for controlling air flow in the vehicle according to the present invention.

FIG. 6 illustrates a schematic view of a variation of a system for controlling air flow in a vehicle in accordance with various embodiments of the present invention.

Referring to FIG. 6, although the system for controlling air flow in a vehicle in accordance with various embodiments of the present invention is shown an example in which the side air introduction unit 60, the connection line 70, the air cleaner 42, the intake hose 44, and so on are mounted to right and left sides of the vehicle, the side air introduction unit 60, the connection line 70, the air cleaner 42, the intake hose 44, and so on may be mounted only to one side of the vehicle.

As previously described, the system and method for controlling air flow in a vehicle in accordance with various embodiments of the present invention can increase the cooling efficiency by supplying the air for cooling the intercooler and the radiator to the intercooler and the radiator directly according to an operation state of the vehicle, and can improve aerodynamic performance by controlling the air being introduced to the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A system for controlling an air flow in a vehicle, comprising:
   a front air introduction apparatus mounted in front of an engine;
   a condenser provided to the front air introduction apparatus;
   an intercooler provided behind the condenser;
   a radiator provided between the intercooler and the engine;

an active air flap provided in front of the condenser for controlling air flow being introduced to the front air introduction apparatus;

a side air introduction apparatus mounted to a side of an engine compartment for forwarding air to the engine;

a connection line connected between the side air introduction apparatus and the front air introduction apparatus;

a control valve for controlling air flow through the connection line;

a plurality of sensors for measuring an operation state of the vehicle; and a control unit for determining an operation state of the vehicle based on a plurality of sensor signals, and controlling operation of the control valve.

2. The system of claim 1, wherein the control unit controls operation of the control valve according to the operation state of the vehicle, to block the connection line, fully to open the connection line, to make the air flow between the condenser and the intercooler, or to make the air flow between the intercooler and the radiator.

3. The system of claim 2, wherein the plurality of sensors include:

a vehicle speed sensor for measuring a speed of a vehicle and forwarding a signal thereof to the control unit;

an air temperature sensor for measuring a temperature of external air and forwarding a signal thereof to the control unit;

a refrigerant temperature sensor for measuring a temperature of refrigerant flowing through the condenser and forwarding a signal thereof to the control unit;

an intercooler temperature sensor for measuring a temperature of air flowing through the intercooler and forwarding a signal thereof to the control unit;

a cooling water temperature sensor for measuring a temperature of cooling water flowing through the radiator and forwarding a signal thereof to the control unit; and an engine RPM sensor for measuring an engine RPM and forwarding a signal thereof to the control unit.

4. The system of claim 1, further comprising a cooling fan provided between the radiator and the engine, wherein the control unit controls the cooling fan and the active air flap based on the plurality of sensor signals.

5. A method of controlling a system for controlling air flow in a vehicle, the method comprising:

when an operation state of the vehicle falls under a high speed and high load condition, a control unit controls to open an active air flap, operates a cooling fan, and controls a control valve to make air flowing through the control valve flow between a condenser and an intercooler;

when the operation state of the vehicle falls under a low speed and high load condition, the control unit controls to open the active air flap, operates the cooling fan, and controls the control valve to make the air flowing through the control valve flow between the intercooler and a radiator;

when the operation state of the vehicle falls under an aerodynamic running condition, the control unit controls to close the active air flap, turns off the operation of the cooling fan, and controls the control valve to block the air flowing through the control valve; and when the operation state of the vehicle falls under a natural cooling condition, the control unit controls to open the active air flap and to operate the cooling fan, and controls the control valve to be opened, wherein the system includes a front air introduction apparatus mounted in front of an engine, the condenser provided to the front air introduction apparatus, the intercooler provided behind the condenser, the radiator provided between the intercooler and the engine, the active air flap provided in front of the condenser for controlling air flow being introduced to the front air introduction apparatus, the cooling fan provided between the radiator and the engine, a side air introduction apparatus mounted to a side of the engine compartment for forwarding air to the engine, a connection line connected between the side air introduction apparatus and the front air introduction apparatus, the control valve for controlling air flow through the connection line, a vehicle speed sensor for measuring a speed of the vehicle and forwarding a signal thereof to the control unit, an air temperature sensor for measuring a temperature of external air and forwarding a signal thereof to the control unit, a refrigerant temperature sensor for measuring a temperature of refrigerant flowing through the condenser and forwarding a signal thereof to the control unit, an intercooler temperature sensor for measuring a temperature of air flowing through the intercooler and forwarding a signal thereof to the control unit, a cooling water temperature sensor for measuring a temperature of cooling water flowing through the radiator and forwarding a signal thereof to the control unit, an engine RPM sensor for measuring an engine RPM and forwarding a signal thereof to the control unit, and a control unit for determining the operation state of the vehicle based on the signals from the sensors and controlling operation of the cooling fan, the active air flap, and the control valve.

\* \* \* \* \*